Sept. 11, 1923.     1,467,817
F. A. SCHULTZ
SEAT SUPPORT FOR TRACTORS AND OTHER MOTOR DRIVEN VEHICLES
Filed Nov. 10, 1920    2 Sheets-Sheet 2

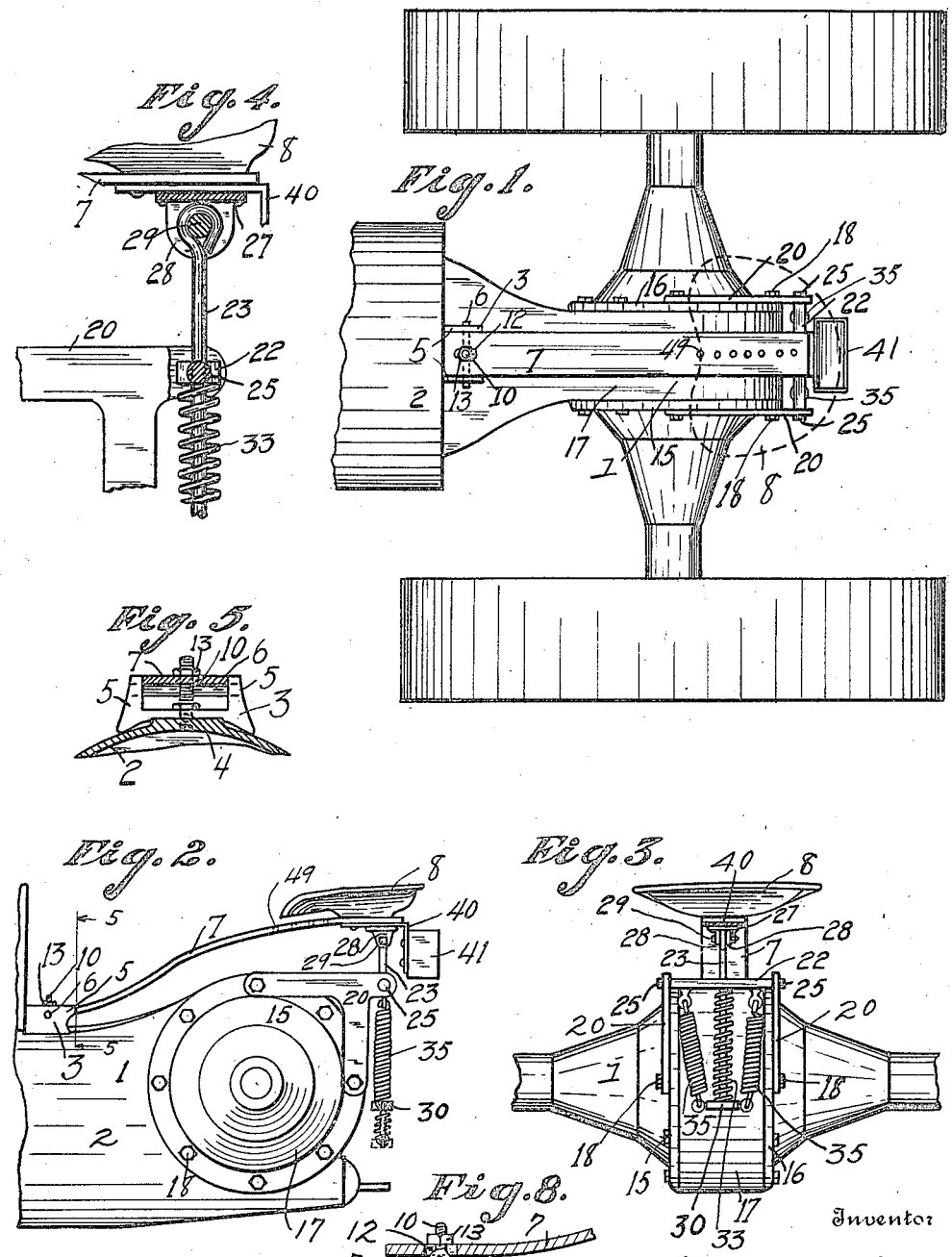

Patented Sept. 11, 1923.

1,467,817

UNITED STATES PATENT OFFICE.

FRANK A. SCHULTZ, OF BURNETT JUNCTION, WISCONSIN, ASSIGNOR TO ANTON SCHULTZ, OF COLUMBUS, WISCONSIN.

SEAT SUPPORT FOR TRACTORS AND OTHER MOTOR-DRIVEN VEHICLES.

Application filed November 10, 1920. Serial No. 423,182.

*To all whom it may concern:*

Be it known that I, FRANK A. SCHULTZ, a citizen of the United States, residing at Burnett Junction, county of Dodge, and State of Wisconsin, have invented new and useful Improvements in Seat Supports for Tractors and Other Motor-Driven Vehicles, of which the following is a specification.

My invention relates to improvements in seat supports for tractors and other motor driven vehicles such as are principally used for agricultural purposes.

The object of my invention is to provide a form of seat support upon which a seat or saddle may be resiliently mounted, and its movements controlled in such a manner as to minimize the danger of unseating the rider, while distributing shocks and converting them into comparatively slow undulatory movements in a vertical plane, quick yielding movements and violent reactions being avoided.

Further objects of my invention are to provide a simple form of seat support which can be readily attached to tractors in common use, which can be attached to tractors in use without requiring the facilities of a machine shop and which will be durable and serviceable to the highest extent consistent with practicability, and commercial cost requirements.

In the drawings:

Figure 1 is a plan view of the rear portion of a tractor embodying my invention.

Figure 2 is a side elevation of the seat support, seat and associated parts.

Figure 3 is a rear elevation of the same.

Figure 4 is an enlarged detail view, partly in side elevation and partly in section of the upper portion of my spring supported saddle post and associated parts.

Figure 5 is an enlarged detail view, of the connection between the front end of the swinging seat supporting arm and the tractor housing drawn on line 5—5 of Figure 2.

Fig. 8 is a longitudinal sectional view of the coupling member.

Like parts are indentified by the same reference characters thruout the several views.

Figure 6:
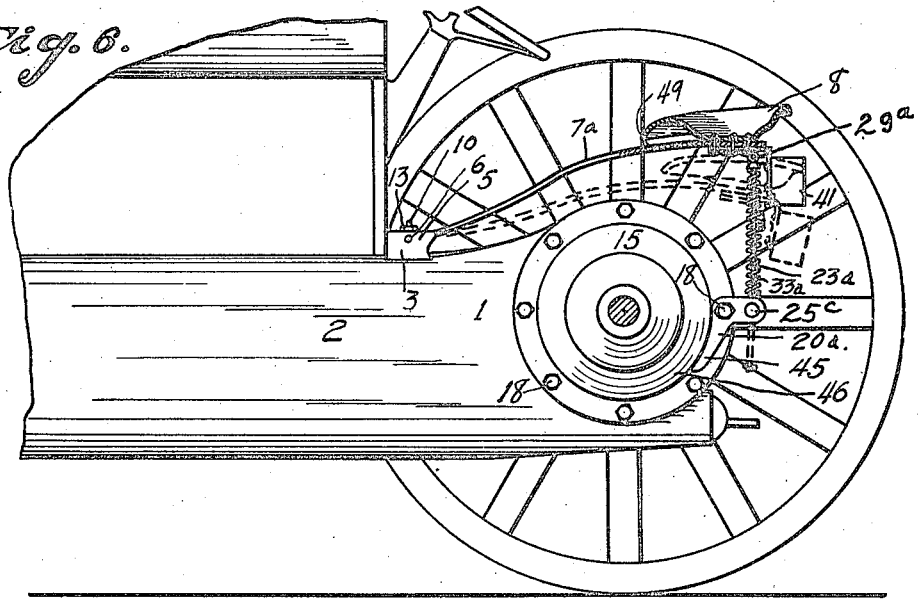
Figure 6 is a side elevation of the rear portion of a tractor embodying my invention in modified form.

Referring to Figures 1 to 5 inclusive, it will be observed that in place of the tool box ordinarily bolted to the transmission housing 1 of the tractor in the rear of the housing body or casing 2, I have secured a coupling member 3 to the housing by a bolt 4. This coupling member has upstanding ears 5 apertured to receive a transverse pin or bolt 6, which serves as a bearing for a flat steel bar 7 to the outer end of which the seat or saddle 8 is rigidly bolted, riveted or otherwise secured. An eye bolt 10 positively connects the bar 7 with its fulcrum or pivot pin 6, the pin 6 passing thru the eye, and the upper portion of the eye and part of the bolt shank being received in a slot 12 in the bar. A nut 13 is threaded on the bolt 10 and spans the slot 12, thus securing the bar in place on the cross pin 6 between the ears 5 of the coupling. The bar 7 is of substantially the same width as the distance between the ears 5 and the latter may therefore co-operate with the eye bolt 10 and nut 13 to hold this end of the bar in place, particularly against lateral movement. The front end of the bar may bear against the rear wall of the housing body 2, or if desired it may be spaced therefrom to avoid frictional contact.

The side plates 15 and 16 of the differential gear case 17 are connected to the body of the gear case by bolts 18 and some of these bolts are utilized to also secure brackets 20 in position to support a shelf plate 22 below the seat 8, and in a position to receive and guide a seat post 23. The shelf plate 22 has end trunnions 25 which allow the plate to tilt on a transverse axis in accommodation with the movements of the post as hereinafter described. A coupling member 27 secured to the bar 7 under the seat has depending ears 28 which support a cross pin 29 about which the upper end of the post 23 is looped to form a connecting eye.

The lower end of the seat post 23 is provided with a cross head 30 between which and the shelf plate 22 a compression spring 33 is disposed, this spring being preferably coiled about the post as shown. Tension springs 35, one on each side, connect the cross head with the shelf plate and resiliently support the cross head with the associated post and seat. The compression spring 33 serves as a shock absorber, preventing violent rebounds, after the supporting springs 35 have been distended by shock or momentum pressure. It will of course be understood that the post 23 slides in a nearly vertical direction thru the aperture in the shelf plate, this plate serving as a guide for the post, a seating for the spring 33 and as a support for the seat thru the medium of the spring 35 and the associated cross head and post.

A bracket 40 is preferably secured to the rear end of the bar 7 and supports the tool box 41, which ordinarily is located in the position occupied by the coupling member 3.

Figure 7:
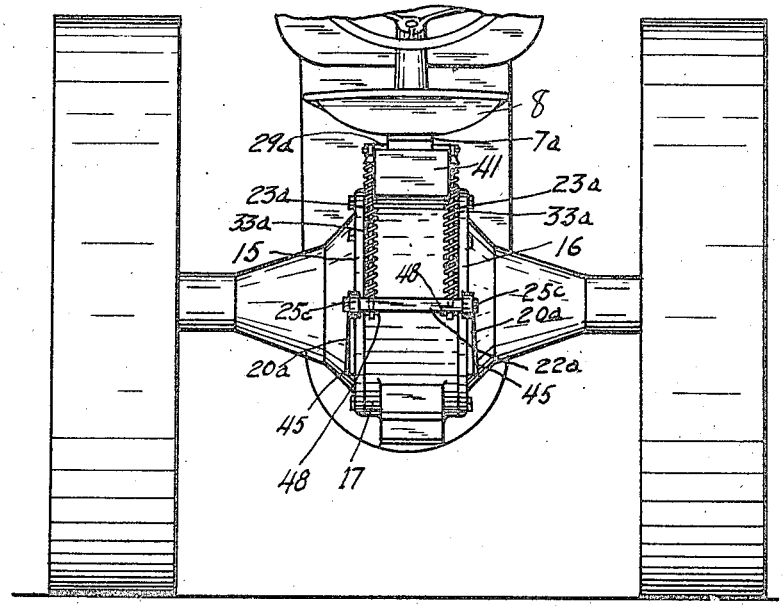
Figure 7 is a rear elevation of the same.

Referring to Figures 6 and 7 it will be observed that in place of the comparatively rigid bar 7 shown in Figure 1 I may employ a bar 7ª of resilient material such as spring steel. The front end of this bar is connected to the housing 1 by a coupling similar to that shown in Figures 1 and 2 but at the rear end of this bar, I provide the seat 8 with depending posts 23ª which slide thru a shelf plate 22ª supported by trunnions 25ᶜ from elbowed brackets 20ª each of which may be secured to a side plate 15 (or 16) by a single bolt 18 and supported by a curved arm 45 fitted to a circular boss 46 on the side plate. The upper ends of the posts 23ª are provided with eyes to receive the transverse coupling pin 29ª which connects them with the seat substantially as above described with reference to Figures 1 to 5 inclusive.

Springs 33ª, coiled about the posts 23 and preferably connected with the shelf plate and posts at their respective ends, perform a function similar to that of the spring 23 in preventing violent rebounds, but these springs may also serve as compression springs acting in co-operation with the bar 7ª. The lower ends of the posts 23 should be provided with cross pins 48 or equivalent devices to prevent them from wholly withdrawing from the shelf plate.

The seat 8 may be pivotally secured to the top of the seat post but is preferably bolted to the bar 7 which is provided with a number of apertures 49 to receive the bolts so that the seat will be adjustable along the tie bar 7 to accommodate persons of different heights. As will be noted from the drawings the rear end of bar 7 is pivoted to the seat post permitting relative motion between the seat post and bar 7 as above described.

I claim:

1. The combination with a tractor body, of a bar secured at one end to the body, a seat post pivotally secured to the free end of the bar, a seat above said post, a guide for the seat post, and means for supporting the post resiliently from the guide, said guide being adapted to accommodate the swinging movement of the post which is due to the connection of said bar thereto.

2. The combination with the rear axle housing of a tractor of a pair of brackets, adapted to be bolted to the housing, a slotted cross rod journaled in an arm of each bracket, a seat post adapted to slide thru the slot in the cross rod, means for resiliently supporting the seat post from the cross rod, a seat pivotally secured to the seat post, and means for restraining the seat against other than vertical movement.

3. The combination with the rear axle housing of a tractor of a pair of brackets adapted to be bolted to the housing, a slotted cross rod journaled in an arm of each bracket, a seat post adapted to slide thru the slot in the cross rod, means for resiliently supporting the seat post from the cross rod, a seat pivotally secured to the seat post, and means for restraining the seat against other than vertical movement, said restraining means comprising a tie rod made fast to the seat and having a hinged connection with a portion of the tractor body ahead of the rear axle.

4. A resiliently supported seat assembly adapted to be mounted upon a tractor and comprising a pair of supporting brackets adapted to be secured to the tractor, a slotted cross rod journaled therein, a pair of seat posts adapted for vertical oscillation thru the slots, springs secured to the seat post and bearing upon the cross rod whereby a downward motion of the seat posts will be resiliently opposed, a tie rod connecting the upper end of the seat posts to the tractor and a seat mounted upon the tie rod adjacent to its connection with the seat post.

5. A seat assembly adapted to be mounted on a tractor and comprising a pair of brackets adapted to be secured to the tractor, a slotted cross rod journaled therein, a pair of seat posts resiliently supported from the cross rod and adapted for vertical oscillation thru the slots, a tie rod pivotally connected with the upper end of the seat post and having a seat mounted thereon, means for adjusting the seat upon the tie rod, and means for pivotally supporting the forward end of the tie rod from the tractor.

6. A seat assembly adapted to be mounted on a tractor and comprising a pair of brackets adapted to be secured to the tractor, a slotted cross rod journaled therein, a pair of seat posts resiliently supported from the cross rod and adapted for vertical oscillation thru the slots, a tie rod pivotally connected with the upper end of the seat post and having a seat mounted thereon, means for adjusting the seat upon the tie rod, and means for pivotally supporting the forward end of the tie rod from the tractor, said last named means comprising a section of channel iron bolted to the tractor, a cross pin carried by the flanges thereof, an eye bolt engaged by the cross pin and provided with a shank extending thru a slot in the tie rod, and a nut threaded upon the shank whereby that portion of the eye above the cross pin may be drawn into the slot until the tie rod rests upon the cross pin.

FRANK A. SCHULTZ.

Witnesses:
A. J. McKERIHAN,
OTTILIS C. STEBER.